(12) United States Patent
Kohtaka et al.

(10) Patent No.: US 6,836,301 B1
(45) Date of Patent: Dec. 28, 2004

(54) LIQUID CRYSTAL DISPLAY DEVICE

(75) Inventors: Satoshi Kohtaka, Kikuchi-gun (JP); Takafumi Hashiguchi, Kikuchi-gun (JP); Yukio Endo, Kikuchi-gun (JP)

(73) Assignee: Advanced Display Inc., Kikuchi-gun (JP)

( * ) Notice: Subject to any disclaimer, the term of this patent is extended or adjusted under 35 U.S.C. 154(b) by 0 days.

(21) Appl. No.: 10/732,357

(22) Filed: Dec. 11, 2003

Related U.S. Application Data

(62) Division of application No. 09/592,587, filed on Jun. 12, 2000, now Pat. No. 6,690,442.

(30) Foreign Application Priority Data

Jun. 15, 1999 (JP) ............................................ 11-167872
Sep. 21, 1999 (JP) ............................................ 11-266956

(51) Int. Cl.⁷ ........................ G02F 1/136; G02F 1/1333; H01L 31/20; H01L 29/15; G09G 3/36
(52) U.S. Cl. ........................... 349/43; 349/155; 257/59; 257/72; 345/92
(58) Field of Search ..................... 349/43, 155; 257/59, 257/72; 345/92

(56) References Cited

U.S. PATENT DOCUMENTS

| | | | |
|---|---|---|---|
| 4,969,718 A | * 11/1990 | Noguchi et al. | ............ 349/144 |
| 5,982,471 A | 11/1999 | Hirakata et al. | |
| 6,268,898 B1 | * 7/2001 | Ihara | ........................... 349/155 |
| 6,392,735 B1 | * 5/2002 | Tani | ........................... 349/156 |

* cited by examiner

*Primary Examiner*—Tarifur R. Chowdhury
*Assistant Examiner*—Hoan C. Nguyen
(74) *Attorney, Agent, or Firm*—Oblon, Spivak, McClelland, Maier & Neustadt, P.C.

(57) ABSTRACT

The liquid crystal display of the present invention includes: a first insulating substrate as an array substrate; display pixels formed in such a manner as to be arranged in array like shape on the first insulating substrate, said display pixels having pixel electrodes electrically connected to each other; a counter substrate formed on a second insulating substrate on which common electrodes are formed; a liquid crystal layer interposed between the first insulating substrate and the second insulating substrate, the first insulating substrate and the second insulating substrate being bonded each other; a transfer electrode for supplying a common electrical potential to common electrodes on the second insulating substrate through a conductive material; wherein the transfer electrode is formed by patterning a conductive thin film that has been formed by the last conductive film forming process of the first insulating substrate; wherein a second conductive metal film, which has been formed in the second conductive film forming process of the first insulating substrate, and is connected to the common electrode potential, and the conductive thin film are connected to each other on the periphery of the transfer electrode through a contact hole or through a direct contact, and the conductive thin film is directly formed on the first insulating substrate at one portion of the center portion of the opening of the transfer electrode.

2 Claims, 5 Drawing Sheets

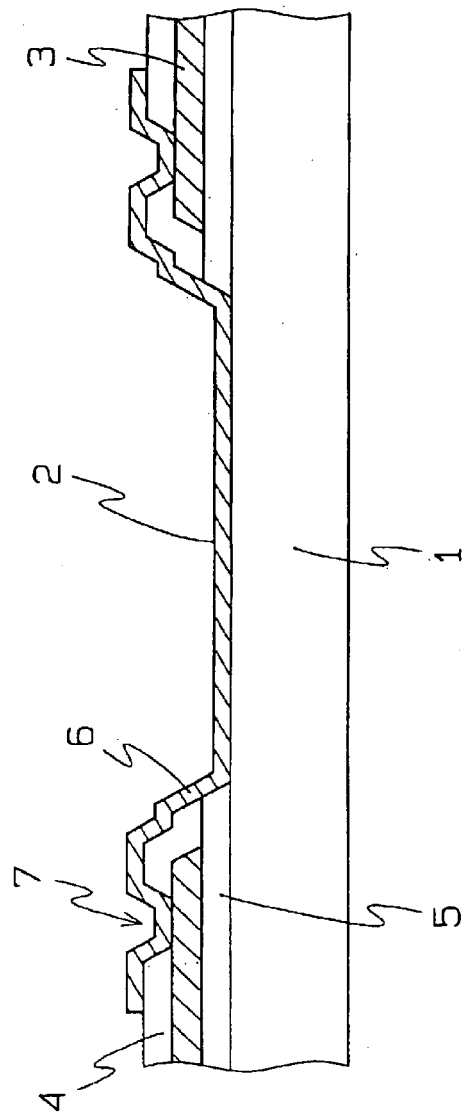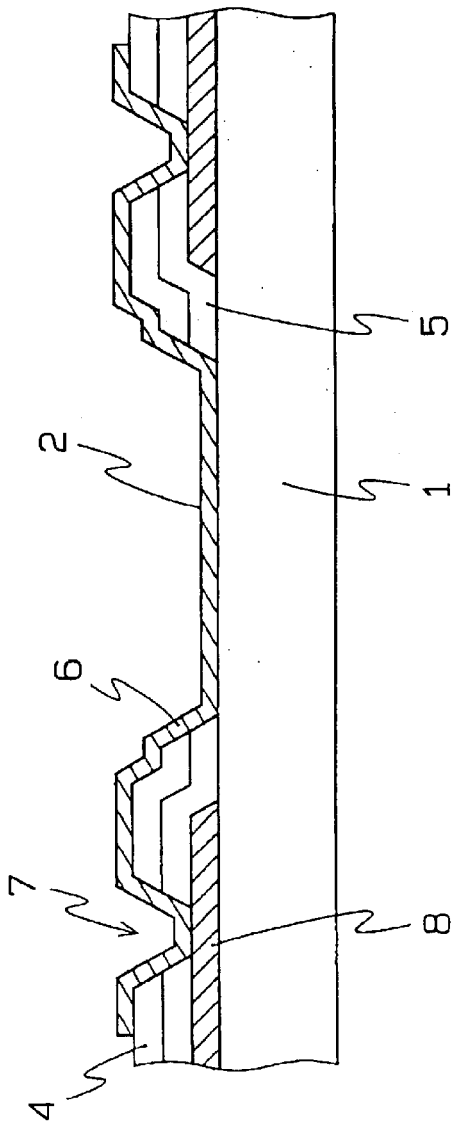

LIQUID CRYSTAL DISPLAY DEVICE

CROSS-REFERENCE TO RELATED APPLICATION

This application is a Divisional of U.S. patent application Ser. No. 09/592,587, filed Jun. 12, 2000 now U.S. Pat No. 6,690,442, and claims priority to Japanese Patent Applications No. 11-167872, filed Jun. 15, 1999, and No. 11-266956, filed Sep. 21, 1999. The contents of these applications are incorporated herein by reference in their entirety.

BACKGROUND OF THE INVENTION

The present invention relates to a liquid crystal display in which a pair of insulating substrates are bonded so as to interpose a liquid crystal layer between the pair of insulating substrates, and more particularly to a shape of inner connecting electrodes of counter electrodes.

In a liquid crystal display using an array substrate on which transfer electrodes are formed by patterning a conductive thin film that has been formed by the last step of forming a conductive film in a step of manufacturing an array substrate, the transfer electrode for supplying a common electrical potential to common electrodes on a counter substrate has a structure in which the film thickness of the laminated layers in the center portion of the transfer electrode is allowed to have the same thickness as the peripheral portion thereof.

As illustrated in FIG. 4, in the structure of the conventional transfer electrode, in the case where an electrical potential is supplied from a transfer electrode 2 on an insulating substrate 1 to a common electrode (conductive thin film 11) on a counter substrate 10 through a conductive material 9 and the common electrode potential is supplied to the transfer electrode 2 through a conductive metal film 3 formed in the second step of forming a conductive film on the insulating substrate 1, the conductive metal film 3 which is electrically connected to a conductive thin film 6 formed in the last step of forming a conductive film of the insulating substrate 1 via a contact hole 7 on the periphery of the transfer electrode 2, and as shown in FIG. 4, the conductive metal film 3 is provided beneath the conductive thin film 6 in such a manner so as to reach substantially the center portion of opening of the transfer electrode. Accordingly, not only an insulating film 5 which is formed after the step of forming the conductive metal film formed in the first step of forming a conductive film on the insulating substrate 1, but also an insulating film 4 which is formed after the step of forming the conductive metal film 3, are respectively provided beneath the conductive thin film 6 of the transfer electrode; thus, the film thickness of the laminated layer in the center portion of the transfer electrode is allowed to have the same film thickness as the peripheral portion thereof.

The above-mentioned conventional arrangement has exemplified the case where a common electrode potential is supplied to the transfer electrode through the conductive metal film 3 formed in the second step of forming a conductive film on the insulating substrate 1.

Also in the case where the electrical potential is supplied to the transfer electrode through another conductive metal film, the conductive metal film and the insulating film are provided so as to reach substantially the center portion of the opening of the transfer electrode; therefore, the film thickness of the laminated layer in the center portion of the transfer electrode is allowed to have the same film thickness as the peripheral portion thereof.

However, in the above-mentioned construction where the film thickness of the laminated layer in the center portion of the transfer electrode is allowed to have the same film thickness as the peripheral portion thereof, in the case where, upon joining to the counter substrate, compressive deformation of a conductive material applied to the transfer electrode is insufficient, the cell gap in the vicinity of the transfer electrode tends to become thicker. As a result, a change in the panel transmittance locally occurs; this causes irregularity in luminance, resulting in degradation in the yield, and in the case when an attempt is made to confirm deformation under compression of the conductive material from the rear face side, since the gap portion of the metal film is small and since the insulating films are interpolated, it is difficult to make an appropriate confirmation.

The present invention has been made so as to solve the above-mentioned problems, and its objective is to make the cell gap in the vicinity of the transfer electrode uniform so that the local change in the panel transmittance is prevented, the uniformity of luminance is improved, and the yield is also improved. Moreover, the gap portion between the metal films is made greater and the insulating film is not interpolated in the gap portion; thus, it is possible to easily confirm deformation under compression of the conductive material from the rear face side of the array substrate.

SUMMARY OF THE INVENTION

One aspect of the liquid crystal display of the present invention includes:

a first insulating substrate;

display pixels formed in such a manner as to be arranged in array like shape on the first insulating substrate, said display pixels having pixel electrodes electrically connected to each other;

a counter substrate formed on a second insulating substrate on which common electrodes are formed;

a liquid crystal layer interposed between the first insulating substrate and the second insulating substrate, the first insulating substrate and the second insulating substrate being bonded each other;

a transfer electrode for supplying a common electrical potential to common electrodes on the second insulating substrate through a conductive material;

wherein the transfer electrode is formed by patterning a conductive thin film that has been formed by the last conductive film forming process of the first insulating substrate;

wherein a second conductive metal film, which has been formed in the second conductive film forming process of the first insulating substrate, and is connected to the common electrode potential, and the conductive thin film are connected to each other on the periphery of the transfer electrode through a contact hole or through a direct contact, and the conductive thin film is directly formed on the first insulating substrate at one portion of the center portion of the opening of the transfer electrode.

In the liquid crystal display mentioned above, on a periphery of the transfer electrode, the first conductive metal film is preferably placed inside the first insulating film that is formed after the film forming process of the first conductive metal film and the second insulating film that is formed after the film forming process of the second conductive metal film that has been formed in the first conductive film forming process of the first insulating substrate.

The other aspect of a liquid crystal display of the present invention includes:

a first insulating substrate;

display pixels formed in such a manner as to be arranged in array like shape on the first insulating substrate, said display pixels having pixel electrodes electrically connected to each other;

a counter substrate formed on a second insulating substrate on which common electrodes are formed;

a liquid crystal layer interposed between the first insulating substrate and the second insulating substrate, the first insulating substrate and the second insulating substrate being bonded to each other;

a transfer electrode for supplying a common electrical potential to common electrodes on the second insulating substrate through a conductive material;

wherein said transfer electrode is formed by patterning a conductive thin film that has been formed by the last conductive film forming process of the first insulating substrate;

wherein a first conductive metal film, which has been formed in the first conductive film forming process of the first insulating substrate, and is connected to the common electrode potential, and the conductive thin film are connected to each other on the periphery of the transfer electrode through a contact hole or through a direct contact, and the conductive thin film is directly formed on the first insulating substrate at one portion of the center portion of the opening of the transfer electrode.

The still other liquid crystal display of the present invention includes:

a first insulating substrate;

display pixels formed in such a manner as to be arranged in array like shape on the first insulating substrate, said display pixels having pixel electrodes electrically connected to each other;

a second insulating substrate;

a counter substrate formed on the a second insulating substrate on which common electrodes are formed;

a liquid crystal layer interposed between the first insulating substrate and the second insulating substrate, the first insulating substrate and the second insulating substrate being bonded to each other;

a transfer electrode for supplying a common electrical potential to common electrodes on the second insulating substrate through a conductive material;

wherein said transfer electrode is formed by patterning a conductive thin film that has been formed by the last conductive film forming process of the first insulating substrate;

wherein the first conductive metal film, the second conductive metal film and the conductive thin film are connected to each other on the periphery of the transfer electrode through a contact hole or through a direct contact, and the conductive thin film is directly formed on the first insulating substrate at one portion of the center portion of the opening of the second transfer electrode.

The yet other liquid crystal display of the present invention includes:

a thin film transistor comprising a gate electrode pattern formed on a first insulating substrate, a first insulating film coating the gate electrode, a first semiconductor pattern formed on the first insulating film, an n-type semiconductor pattern provided on the semiconductor pattern in such a manner as to be opposed to each other, and source/drain electrode patterns respectively provided on the n-type semiconductor pattern;

a second insulating film formed on the source/drain electrode pattern; and a pixel electrode pattern provided on the second insulating film; and a transfer electrode formed by the pixel electrode pattern;

wherein the pixel electrode pattern is connected to the source/drain electrode pattern through a step for forming a hole after forming the second insulating film, and a transfer electrode;

wherein the transfer electrode supplies an electrical potential to the common electrodes on the second insulating substrate through a conductive material;

wherein the source/drain electrode pattern and the pixel electrode pattern are connected to each other on the periphery of the transfer electrode through a contact hole or through a direct contact, and one portion of the center portion of the opening of the transfer electrode is formed by directly forming the pixel electrode pattern on the first insulating substrate.

In the liquid crystal display mentioned above, the source/drain electrode pattern is placed inside the first insulating film and the second insulating film on the periphery of the transfer electrode.

The yet other liquid crystal display of the present invention includes:

a first and second insulating substrates;

a liquid crystal layer interposed between the first and second insulating substrates;

a thin film transistor comprising a gate electrode pattern formed on the first insulating substrate, a first insulating film coating the gate electrode, a first semiconductor pattern formed on the first insulating film, an n-type semiconductor pattern that is provided on the semiconductor pattern in such a manner as to be opposed to each other, and source/drain electrode patterns respectively provided on the n-type semiconductor pattern;

a second insulating film formed on the source/drain electrode pattern; and a pixel electrode pattern placed on the second insulating film;

wherein the pixel electrode pattern is connected to the source/drain electrode pattern through a step for forming a hole after forming the second insulating film, and a transfer electrode formed by the pixel electrode pattern;

wherein the transfer electrode supplies an electrical potential to the common electrodes on the second insulating substrate through a conductive material;

wherein the gate electrode pattern and the pixel electrode pattern are connected to each other on the periphery of the transfer electrode through a contact hole or through a direct contact, and one portion of the center portion of the opening of the transfer electrode is formed by directly forming the pixel electrode pattern on the first insulating substrate.

The yet other liquid crystal display of the present invention includes:

a first and second insulating substrates;

a liquid crystal layer interpolated between the first and second insulating substrates;

a thin film transistor comprising a gate electrode pattern formed on the first insulating substrate, a first insulating film coating the gate electrode, a first semiconductor pattern formed on the first insulating film, an n-type semiconductor pattern provided on the semiconductor pattern in such a manner as to be opposed to each other, and source/drain electrode patterns respectively provided on the n-type semiconductor pattern;

a second insulating film formed on the source/drain electrode pattern; and a pixel electrode pattern provided on the second insulating film;

wherein the pixel electrode pattern is connected to the source/drain electrode pattern through a step for forming a hole after forming the second insulating film, and a transfer electrode formed by the pixel electrode;

wherein the transfer electrode supplies an electrical potential to the common electrodes on the second insulating substrate through a conductive material;

wherein the gate electrode pattern, the source/drain electrode pattern and the pixel electrode pattern are connected to each other on the periphery of the transfer electrode through a contact hole or through a direct contact, and one portion of the center portion of the opening of the transfer electrode is formed by directly forming the pixel electrode pattern on the first insulating substrate.

BRIEF DESCRIPTION OF THE DRAWINGS

FIG. 1 is a cross sectional view showing a transfer electrode of EMBODIMENT 1 of the present invention;

FIG. 2 is a cross sectional view showing a transfer electrode of EMBODIMENT 2 of the present invention;

DETAILED DESCRIPTION

EMBODIMENT 1

Figure 4:
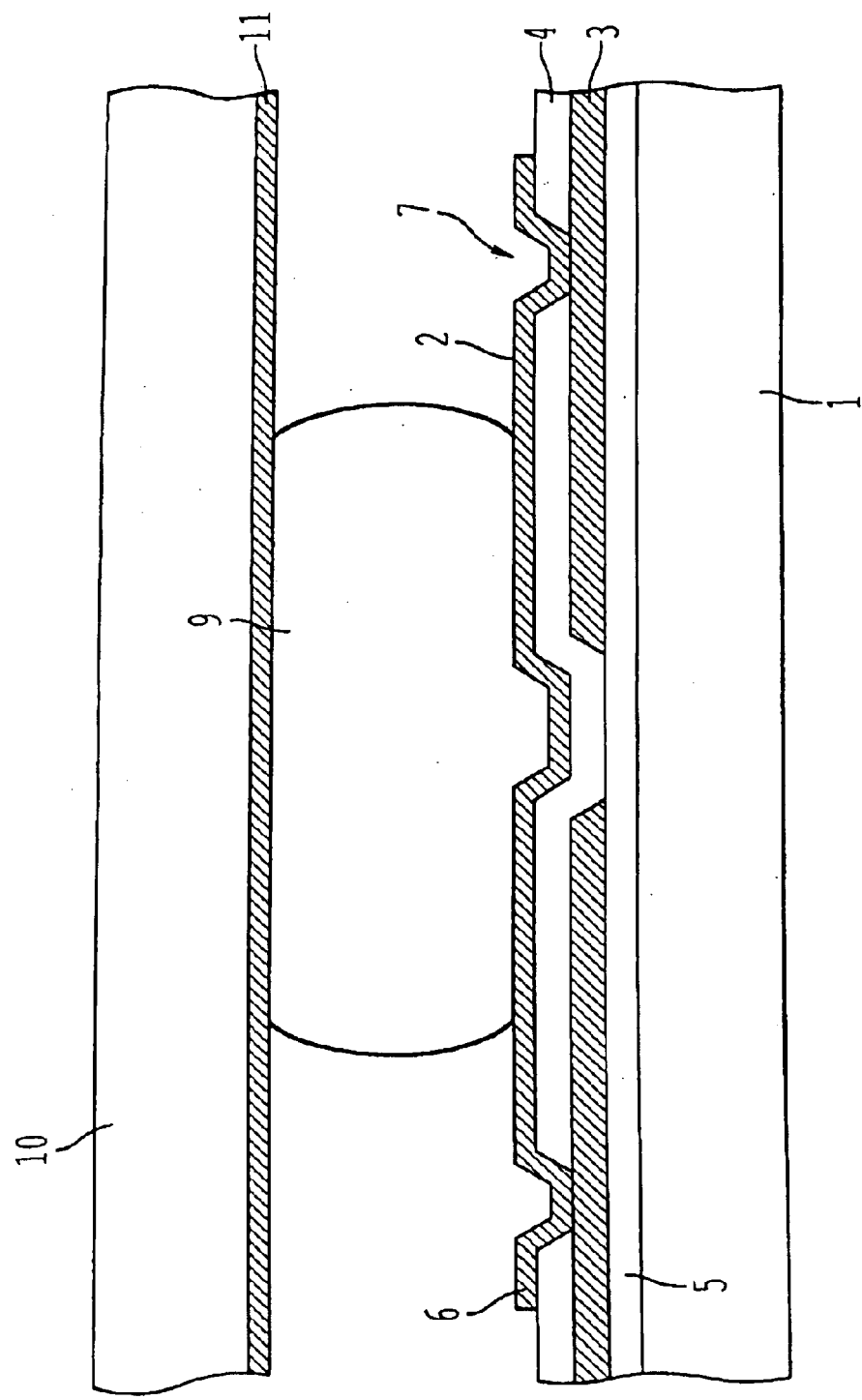
FIG. 4 is a cross sectional view showing a conventional transfer electrode.

Referring to FIG. 1, the following description will discuss the EMBODIMENT 1 of the present invention. FIG. 1 shows a cross-cross cross sectional view of a transfer electrode in the EMBODIMENT 1 of the present invention, and the following description will discuss the construction together with the functions thereof. Here, the construction in which an electrical potential is connected to the common electrodes (conductive thin film) on the opposing substrate side from the transfer electrode on the array substrate through the conductive material is the same as that shown in FIG. 4. FIG. 1 shows a cross-sectional shape of the transfer electrode on an array substrate side of a liquid crystal display constituted by a pair of insulating substrates that are joined to each other with a liquid crystal layer interpolated in between; and reference number 1 is an insulating substrate (array substrate), 2 is a transfer electrode, 3 is a metal film of the second layer from the substrate face and that has been formed in the second conductive film forming process of the insulating substrate 1, 4 is an insulating film of the second layer formed after the metal film 3 as the second layer, 5 is an insulating film of the first layer formed after the metal film as the first film as the first layer formed in the first conductive film forming process of the insulating substrate 1, 6 is a transparent conductive thin film that is formed in the last conductive film forming process of the insulating substrate 1 and that forms the transfer electrode 2, and 7 is a contact hole. transfer electrode, 3 is a metal film of the second layer from the substrate face and that has been formed in the second conductive film forming process of the insulating substrate 1, 4 is an insulating film of the second layer formed after the metal film 3 as the second layer, 5 is an insulating film of the first layer formed after the metal film as the first layer formed in the first conductive film forming process of the insulating substrate 1, 6 is a transparent conductive thin film that is formed in the last conductive film forming process of the insulating substrate 1 and that forms the transfer electrode 2, and 7 is a contact hole.

Figure 5:
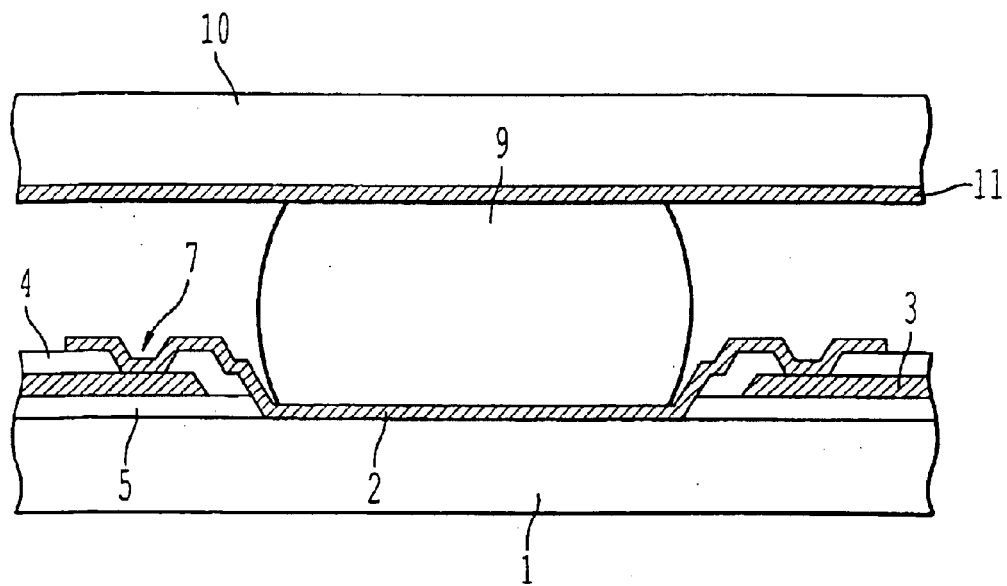
FIG. 5 is a cross sectional view showing a transfer electrode and the second metal film.

When an electrical potential is supplied to the common electrodes on the opposing substrate, a conductive material is applied to the center portion of the transfer electrode 2, and this is connected to an electrode section on the opposing substrate. FIG. 5 shows a case in which a common electrical potential on the insulating substrate 1 is supplied to the transfer electrode section through the metal film 3 as the second layer that has been formed in the second conductive film forming process of the insulating substrate 1. The metal film 3 supplies the common electrical potential to the conductive thin film 6 through the contact hole 7 in the vicinity of the transfer electrode 2, and the common electrical potential is transferred to a conductive material 9 and to a common electrode 11 on the second insulating substrate 10. In this construction, the conductive thin film 6 allows at least one portion in the center portion of the transfer electrode 2 to be directly formed on the insulating substrate 1. In the present specification, one portion refers to a range of approximately 10% to 90% of the opening section of the transfer electrode 2.

Moreover, as illustrated in FIG. 1, the metal film 3 of the second layer is placed so as to be interpolated between the insulating films 4 and 5 of the first layer and the second layer. With this arrangement, it is possible to avoid a problem that arises when the metal film 3 is placed so as to be exposed outside from the edges of the insulating films 4 and 5. In other words, it is possible to solve the problem that at the time of hole-forming processes of the insulating films 4 and 5, below the edge of the metal film 3 of the second layer, the insulating film 5 of the first layer is etched outward from the center of the transfer electrode 2 in a grooved form with the result that the coverage of the conductive thin film 6 deteriorates.

The above-mentioned arrangement makes it possible to make the center portion of the transfer electrode 2 thin as compared with the peripheral portion; therefore, even in the case of an insufficient deformation under compression of the conductive material, the cell gap in the vicinity of the transfer electrode is not made thicker so that the cell gap in the vicinity of the transfer electrode 2 is uniformly maintained. Thus, it is possible to prevent local variations in the panel transmittance, to improve the uniformity in luminance, and also to improve the yield. Moreover, the gap portion of the metal film is made comparatively wider, and the insulating film is not interpolated in the gap portion; therefore, the deformation under compression of the conductive material can be confirmed easily from the rear face of the array substrate.

EMBODIMENT 2

Referring to FIG. 2, the following description will discuss the EMBODIMENT 2. FIG. 2 shows a cross-cross cross sectional view of a transfer electrode in the EMBODIMENT 2 of the present invention, and the following description will discuss the construction together with the functions thereof. Here, the construction in which an electrical potential is connected to the common electrodes (conductive thin film) on the opposing substrate side from the transfer electrode on the array substrate through the conductive material is the same as that shown in FIG. 4. FIG. 2 shows a cross-sectional shape of the transfer electrode on an array substrate side of a liquid crystal display constituted by a pair of insulating substrates that are joined to each other with a liquid crystal layer interpolated in between; and reference number 1 is an insulating substrate (array substrate); 2 is a transfer electrode; 4 is an insulating film of the second layer that is formed after a metal film of the second layer that has been formed in the second conductive film forming process of the insulating substrate 1; 5 is an insulating film of the first layer that is formed after a metal film of the first layer that has been formed in the first conductive film forming process of the insulating substrate 1; 6 is a conductive thin film formed in the last conductive film forming process of the insulating substrate 1; 7 is a contact hole; and 8 is a metal film of the first layer formed in the first conductive film forming process of the insulating substrate 1.

Figure 6:
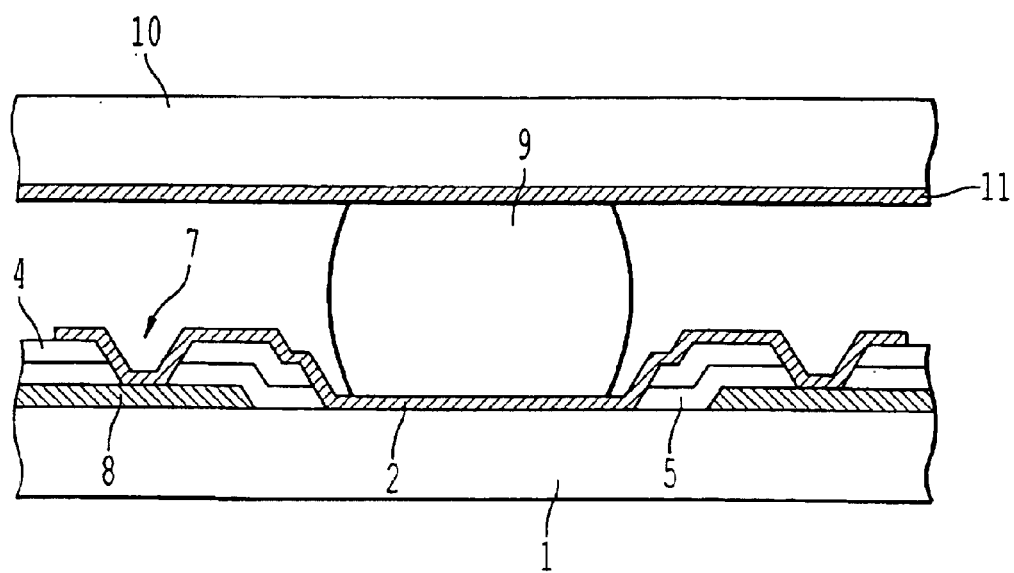
FIG. 6 is a cross sectional view showing a transfer electrode and the first metal film.

When an electrical potential is supplied to the common electrodes on the opposing substrate, a conductive material is applied to the center portion of the transfer electrode 2, and this is connected to an electrode section on the opposing substrate. FIG. 6 shows a case in which a common electrical potential on the insulating substrate 1 is supplied to the transfer electrode section through the metal film 8 as the first layer that has been formed in the first conductive film forming process of the insulating substrate 1. The metal film 8 supplies the common electrical potential to the conductive thin film 6 through the contact hole 7 in the vicinity of the transfer electrode 2, and the common electrical potential is transferred to a conductive material 9 and to a common electrode 11 on the second insulating substrate 10. In this construction, the conductive thin film 6 allows at least one portion in the center portion of the transfer electrode 2 to be directly formed on the insulating substrate 1. Moreover, FIG. 2 has exemplified the structure in which the metal film 8 is placed under the insulating films 4 and 5, and since no insulating film that is subjected to etching is located under the metal film 8, no problem arises as to the coverage of the conductive thin film 6 so that the metal film 8 may be removed at the same positions as the insulating films 4 and 5. Moreover, in the case of the metal film 8 having a shape that allows it to expose toward the center portion from the insulating films 4 and 5, it is not necessary to provide a structure having individual contact holes as shown in FIG. 2, and the metal film 8 is allowed to directly contact the conductive thin film 6 by removing the insulating films 4 and 5 on the exposed portion of the metal film 8 upon removing the insulating films 4 and 5 at the center portion of the opening section of the transfer electrode 2, thereby making it possible to supply the common electrical potential.

The above-mentioned arrangement makes it possible to make the center portion of the transfer electrode 2 thin as compared with the peripheral portion; therefore, even in the case of an insufficient deformation under compression of the conductive material, the cell gap in the vicinity of the transfer electrode is not made thicker so that the cell gap in the vicinity of the transfer electrode 2 is uniformly maintained. Thus, it is possible to prevent local variations in the panel transmittance, to improve the uniformity in luminance, and also to improve the yield. Moreover, the gap portion of the metal film is made comparatively wider, and the insulating film is not interpolated in the gap portion; therefore, the deformation under compression of the conductive material can be confirmed easily from the rear face of the array substrate.

EMBODIMENT 3

Figure 3:
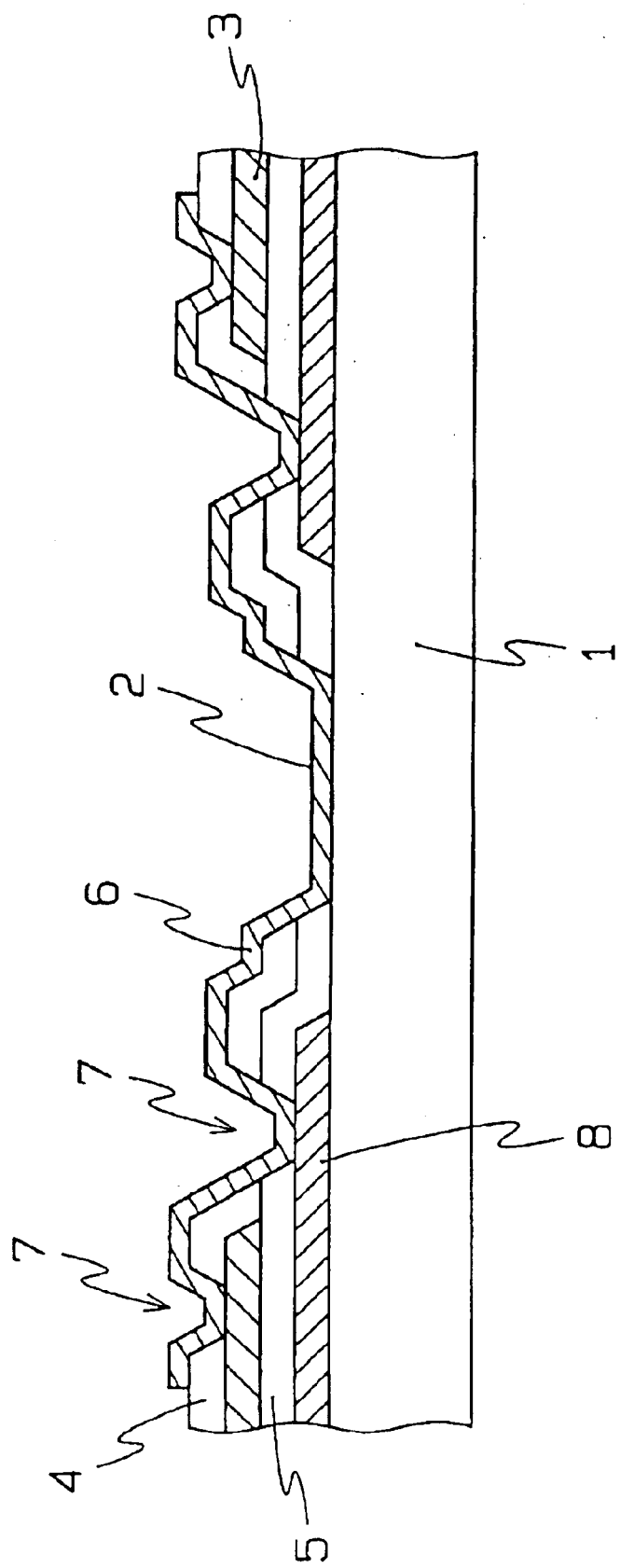
FIG. 3 is a cross sectional view showing a transfer electrode of EMBODIMENT 3 of the present invention.

Referring to FIG. 3, the following description will discuss the EMBODIMENT 3 of the present invention. FIG. 3 shows a cross-cross cross sectional view of a transfer electrode in the EMBODIMENT 2 of the present invention, and the following description will discuss the construction together with the functions thereof. Here, the construction in which an electrical potential is connected to the common electrodes (conductive thin film) on the opposing substrate side from the transfer electrode on the array substrate through the conductive material is the same as that shown in FIG. 4. FIG. 3 shows a cross-sectional shape of the transfer electrode on an array substrate side of a liquid crystal display constituted by a pair of insulating substrates that are joined to each other with a liquid crystal layer interpolated in between; and reference number 1 is an insulating substrate (array substrate); 2 is a transfer electrode; 3 is a metal film of the second layer that is formed in the second conductive film forming process of the insulating substrate 1; 4 is an insulating film of the second layer that is formed after a metal film 3 that has been formed in the second conductive film forming process of the insulating substrate 1; 5 is an insulating film of the first layer that is formed after a metal film 8 of the first layer that has been formed in the first conductive film forming process of the insulating substrate 1; 6 is a conductive thin film formed in the last conductive film forming process of the insulating substrate 1; 7 is a contact hole; and 8 is a metal film of the first layer formed in the first conductive film forming process of the insulating substrate 1.

Figure 7:
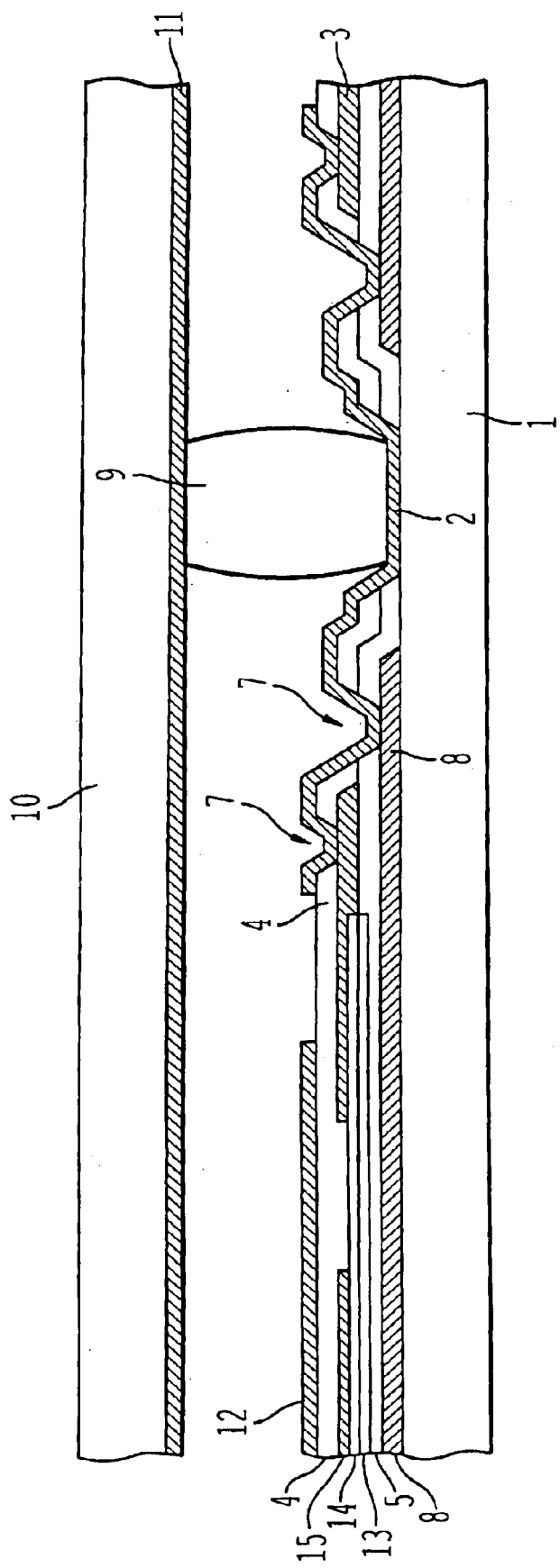
FIG. 7 is a cross sectional view showing a transfer electrode, first and second metal films, a thin film transistor, and a pixel electrode.

When an electrical potential is supplied to the common electrodes on the opposing substrate, a conductive material is applied to the center portion of the transfer electrode 2, and this is connected to an electrode section on the opposing substrate. FIG. 7 shows a case in which a common electrical potential on the insulating substrate 1 is supplied to the transfer electrode section through the metal film 8 as the first layer that has been formed in the first conductive film forming process of the insulating substrate 1 and the metal film 3 as the second layer that has been formed in the second conductive film forming process of the insulating substrate 1. The metal films 3 and 8 of the first and second layers supply the common electrical potential to the conductive thin film 6 through the contact hole 7 in the vicinity of the transfer electrode 2, and the common electrical potential is transferred to a conductive material 9 and to a common electrode 11 on the second insulating substrate 10. In this construction, one thin film transistor (TFT) is shown formed on the substrate 1 of the first metal film 8, the first insulating film 5, a semiconductor pattern 13 layered on the first insulating film 5, an n-type semiconductor pattern 14 layered on the semiconductor pattern 13, and a second metal film 3 as a source/drain electrode pattern layer 15 formed on the n-type semiconductor pattern 14 (millions of TFT are formed on the substrate). In addition, a pixel electrode 12 if formed on the TFT, and the conductive thin film 6 allows at least one portion in the center portion of the transfer electrode 2 to be directly formed on the insulating substrate 1. Moreover, FIG. 3 has exemplified the structure in which the metal film 8 of the first layer is placed under the insulating films 4 and 5; however, in the same manner as the EMBODI- MENT 2, the metal film 8 may be removed at the same positions as the insulating films 4 and 5 on the center side of the transfer electrode. Moreover, in the case of the metal film 8 having a shape that allows it to expose toward the center portion from the insulating films 4 and 5, it is not necessary to provide a structure having independent contact holes on the metal film 8 of the first layer as shown in FIG. 3, and the metal film 8 is allowed to directly contact the conductive thin film 6 by removing the insulating films 4 and 5 on the exposed portion of the metal film 8 upon removing the insulating films 4 and 5 at the center portion of the transfer electrode 2, thereby making it possible to supply the common electrical potential.

The above-mentioned arrangement makes it possible to make the center portion of the transfer electrode 2 thin as compared with the peripheral portion; therefore, even in the case of an insufficient deformation under compression of the conductive material, the cell gap in the vicinity of the transfer electrode is not made thicker so that the cell gap in the vicinity of the transfer electrode 2 is uniformly maintained. Thus, it is possible to prevent local variations in the panel transmittance, to improve the uniformity in luminance, and also to improve the yield. Moreover, the gap portion of the metal film is made comparatively wider, and the insulating film is not interpolated in the gap portion; therefore, the deformation under compression of the conductive material can be confirmed easily from the rear face of the array substrate.

EMBODIMENT 4

Referring to FIGS. 1 to 3, the following description will discuss EMBODIMENT 4 of the present invention. The present EMBODIMENT will give detailed explanations of the laminated film constructions of transfer electrode sections of EMBODIMENT 1 to EMBODIMENT 3, and the structures of the transfer electrode center portions are the same as those shown in FIGS. 1 to 3; therefore, the description thereof is omitted. The following description will discuss the outline of the laminated film manufacturing processes of FIGS. 1 to 3. A low resistance metal, such as Al (aluminum) or Cr (chromium), was formed on an insulating substrate 1 (array substrate) as a film by means of sputtering, etc., and this was patterned by using resist formed by a normal photolithographic printing method, etc., to form a metal film 8 of the first layer forming a gate electrode. Next, an insulating film 5 of the first layer made of a silicon nitride film, etc., an i-type amorphous silicon film forming a semiconductor layer and an n-type amorphous silicon film to which impurities had been injected were successively formed by using the plasma CVD method, etc. Then, the above-mentioned i-type and n-type amorphous silicon was patterned by using resist formed by a photolithographic printing method, etc.. And after that a low resistance metal, such as Al or Cr, was formed by means of sputtering, etc. and this was patterned by using resist formed by a normal photolithographic printing method, etc., to form a metal film 3 of the second layer forming a source/drain electrode. Next, the insulating film 4 of the second layer, made of a silicon nitride film, etc. was deposited by using the plasma CVD method, etc., and contact holes 7 were formed in the above-mentioned insulating films 5 and 4 of the first and second layers by means of dry etching, etc. Simultaneously, an area in the center of the insulating substrate 1, at which the transfer electrode 2 is formed, was allowed to expose. Next, a conductive thin film 6 made of ITO (Indium Tin Oxide), etc. was formed by means of sputtering, etc., and this was patterned by using resist formed by a photolithographic printing method, etc. to form pixel electrodes and transfer electrodes. In the case when an electrical potential is supplied to the common electrodes on the opposing substrate, a conductive material is applied to the center portion of the transfer electrode 2, and this is connected to the common electrode section on the opposing substrate.

In the case when, as illustrated in FIG. 1, a common electrical potential on the insulating substrate 1 is supplied to the transfer electrode section through the source/drain electrode pattern made of the metal film 3 of the second layer, the source/drain electrodes (second layer metal film 3) and the transfer electrode 2 (conductive thin film 6) are connected through the contact hole 7 on the peripheral portion of the transfer electrode, as shown in the Figure.

As illustrated in FIG. 2, in the case when a common electrical potential on the insulating substrate 1 is supplied to the transfer electrode section through the gate electrode pattern made of the metal film 8 of the first layer, the gate electrode (first layer metal film 8) and the transfer electrode (conductive thin film 6) are connected through the contact hole 7 on the peripheral portion of the transfer electrode, as shown in the Figure.

As illustrated in FIG. 3, in the case when a common electrical potential on the insulating substrate 1 is supplied to the transfer electrode section through the source/drain electrode pattern and the gate electrode pattern, the source/drain electrode pattern, the gate electrode pattern and the transfer electrode (conductive thin film 6) are connected through the contact hole 7 on the peripheral portion of the transfer electrode, as shown in the Figure.

The above-mentioned arrangement makes it possible to make the center portion of the transfer electrode 2 thin as compared with the peripheral portion; therefore, even in the case of an insufficient deformation under compression of the conductive material, the cell gap in the vicinity of the transfer electrode is not made thicker so that the cell gap in the vicinity of the transfer electrode 2 is uniformly maintained. Thus, it is possible to prevent local variations in the panel transmittance, to improve the uniformity in luminance, and also to improve the yield. Moreover, the gap portion of the metal film is made comparatively wider, and the insulating film is not interpolated in the gap portion; therefore, the deformation under compression of the conductive material can be confirmed easily from the rear face of the array substrate.

Referring to EMBODIMENT 1 to EMBODIMENT 4, the present invention has been explained; however, the present invention is not intended to be limited by EMBODIMENT 1 to EMBODIMENT 4, and various modifications may of course be made within the scope of the present invention.

For example, not limited to the layer construction of the metal films and the insulating films formed on the array substrate of EMBODIMENT 1 to EMBODIMENT 4, the feature of the present invention in which the conductive thin film 6 to be connected to the conductive material 9 forming the transfer electrode is directly formed on the array substrate 1 may be applied to another substrate construction having a different film-forming process.

In the liquid crystal display of the present invention, since at least one portion of the central portion of the transfer electrode is directly formed on the insulating substrate on the array substrate side, it is possible to narrow the center portion of the transfer electrode as compared with the peripheral portion; therefore, even in the case of an insufficient deformation under compression of the conductive material, the cell gap in the vicinity of the transfer electrode is not made thicker so that the cell gap in the vicinity of the transfer electrode is uniformly maintained. Thus, it becomes possible to prevent local variations in the panel transmittance, to improve the uniformity in luminance, and also to improve the yield. Moreover, the gap portion of the metal film is made comparatively wider, and the insulating film is not interpolated in the gap portion; therefore, the deformation under compression of the conductive material can be confirmed easily from the rear face of the array substrate.

What is claimed is:

1. A liquid crystal display comprising:
  a first insulating substrate as an array substrate;
  display pixels formed in such a manner as to be arranged in array like shape on the first insulating substrate;
  a second insulating substrate as a counter substrate on which common electrodes are formed;
  a liquid crystal layer interposed between the first insulating substrate and the second insulating substrate, the first insulating substrate and the second insulating substrate being bonded to each other;
  a first metal film formed on the first insulating substrate for a gate electrode pattern;
  a first insulating film formed after the first metal film;
  a second metal film formed after the first insulating film for a source/drain electrode pattern;
  a second insulating film formed after the second metal film;
  a transparent conductive thin film formed after the second insulating film for a pixel electrode pattern; and
  a transfer electrode formed of a same transparent conductive thin film for the pixel electrode pattern, said transfer electrode transfers a common electrical potential to a common electrode on the second insulating substrate through a conductive material interposed therebetween,
  wherein the transfer electrode is connected to a pattern of said first metal film supplied with the common electrical potential through a contact hole or through a direct contact in a periphery portion of the transfer electrode, and a center portion of the transfer electrode is formed directly on the first insulating substrate and the center portion of the transfer electrode is in contact with the conductive material, and
  wherein a distance between said center portion of said transfer electrode and said common electrodes is larger than a distance between said periphery portion of said transfer electrode and said common electrodes.

2. A liquid crystal display comprising:
  a first insulating substrate as an array substrate;
  a second insulating substrate as an opposite substrate having a common electrode;
  a liquid crystal layer interposed between the first and second insulating substrates;
  a first metal film formed on the first insulating substrate as a gate electrode pattern;
  a first insulating film covering the first metal film;
  a thin film transistor formed of said gate electrode pattern, said first insulating film, a semiconductor pattern layered on the first insulating film, an n-type semiconductor pattern layered on the semiconductor pattern, and a second metal film as a source/drain electrode pattern layered on the n-type semiconductor pattern;
  a second insulating film layered on the source/drain electrode pattern;
  a conductive thin film formed on the second insulating film;
  a pixel electrode pattern formed of the conductive thin film connected to said source/drain electrode pattern by forming a contact hole through said second insulating film; and
  a transfer electrode pattern separately formed of the same conductive thin film for the pixel electrode pattern supplying a common electrical potential to the common electrode on the second insulating substrate through a conductive material,
  wherein a pattern having a common electric potential formed of said first metal film and the transfer electrode are connected to each other on the periphery of the transfer electrode through a contact hole or through a direct contact, and a center portion of the transfer electrode is formed by directly forming the conductive thin film on the first insulating substrate, and
  wherein a distance between said center portion of said transfer electrode and said common electrodes is larger than a distance between said periphery portion of said transfer electrode and said electrodes.

* * * * *